US010460375B2

(12) United States Patent
Chen et al.

(10) Patent No.: US 10,460,375 B2
(45) Date of Patent: Oct. 29, 2019

(54) DEVICE AND METHOD FOR IMPLEMENTING A VEHICLE SHARING REWARD PROGRAM

(71) Applicant: INTERNATIONAL BUSINESS MACHINES CORPORATION, Armonk, NY (US)

(72) Inventors: Chun-Yen Chen, Toufen Township, Miaoli County (TW); Jian-Ren Chen, Hsinchu (TW); Su-Chen Huang, Taoyuan (TW); June-Ray Lin, Taipei (TW)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 773 days.

(21) Appl. No.: 14/099,039

(22) Filed: Dec. 6, 2013

(65) Prior Publication Data
US 2015/0161718 A1 Jun. 11, 2015

(51) Int. Cl.
*G06Q 20/18* (2012.01)
*G06Q 30/06* (2012.01)
*G06Q 30/08* (2012.01)

(52) U.S. Cl.
CPC ......... *G06Q 30/0645* (2013.01); *G06Q 20/18* (2013.01); *G06Q 30/08* (2013.01)

(58) Field of Classification Search
CPC ................................. G06Q 30/0645
USPC ....................................... 705/26.3
See application file for complete search history.

(56) References Cited

U.S. PATENT DOCUMENTS

| 7,133,839 B2 | 11/2006 | Hayashi et al. |
| 7,627,423 B2 | 12/2009 | Brooks |
| 8,364,389 B2* | 1/2013 | Dorogusker ....... A63B 24/0062 340/427 |
| 8,538,693 B2 | 9/2013 | McBride et al. |

(Continued)

FOREIGN PATENT DOCUMENTS

| CN | 101409001 A | 4/2009 |
| CN | 102693556 A | 9/2012 |
| TW | 201133364 A | 10/2011 |

OTHER PUBLICATIONS

Nice Ride Minnesota, Energy Weekly News: Feb. 19, 2010 p. 229.*
(Continued)

*Primary Examiner* — Scott A Zare
(74) *Attorney, Agent, or Firm* — Amin, Turocy & Watson, LLP

(57) ABSTRACT

Device and method for implementing a vehicle sharing reward program. The present invention provides for a cost-sharing plan where two or more constituencies share the rental cost associated with a user who rents a shared vehicle in a vehicle sharing program. This results in a reimbursement of the rental cost to the user. When enrolling in the vehicle sharing reward program, the user is given a health prescription to adhere to on any trip taken while using a shared vehicle. On a selected travel route, the user visits a vehicle sharing station, where the sharing station includes a kiosk that the user uses to check-in and upload relevant information such as distance traveled and locations visited. By complying with the health prescription issued to the user, the user can have its total rental cost reimbursed.

11 Claims, 6 Drawing Sheets

(56) References Cited

U.S. PATENT DOCUMENTS

| | | | | |
|---|---|---|---|---|
| 8,630,897 | B1* | 1/2014 | Prada Gomez | G06Q 30/0241 705/14.11 |
| 2002/0174077 | A1* | 11/2002 | Yui | G06Q 20/127 705/400 |
| 2007/0239478 | A1* | 10/2007 | Yui | G06Q 20/127 705/307 |
| 2008/0108481 | A1* | 5/2008 | Limma | A61B 5/1112 482/8 |
| 2011/0183306 | A1* | 7/2011 | Krejcarek | G09B 7/00 434/238 |
| 2011/0307394 | A1* | 12/2011 | Rzepecki | G06Q 30/00 705/307 |
| 2012/0196631 | A1* | 8/2012 | Fajstrup Axelsen | G06Q 20/32 455/466 |
| 2013/0017934 | A1* | 1/2013 | Tayebi | A63B 21/154 482/129 |
| 2015/0074004 | A1* | 3/2015 | Song | G07F 17/0057 705/307 |

OTHER PUBLICATIONS

Chekuri et al., CS 598CSC: Approximation Algorithms. Lecture date: Feb. 9, 2011, University of Illinois, scribe: Kyle Fox (2009).

* cited by examiner

Fig. 4

Acceptable Travel Plans 3, 1, 3. EAE: 12.67 km
3, 1, 6, 1, 3. EAE: 16.06 km
3, 1, 6, 3. EAE: 15.99 km
3, 1, 6, 11, 3. EAE: 16.57 km
3, 1, 11, 1, 3. EAE: 14.93 km
3, 1, 11, 1, 11, 3. EAE: 17.06 km
3, 1, 11, 3. EAE: 14.80 km
3, 1, 11, 6, 3. EAE: 16.66 km
3, 1, 11, 6, 11, 3. EAE: 17.23 km
...

Fig. 6

DEVICE AND METHOD FOR
IMPLEMENTING A VEHICLE SHARING
REWARD PROGRAM

BACKGROUND OF THE INVENTION

1. Field of the Invention

The present invention relates to transportation systems. More specifically, a cost-sharing service for use in an active transportation system to promote public health.

2. Description of the Related Art

Physical inactivity contributes to adverse health outcomes. Forms of transportation that involve physical exertion such as running, biking, or kayaking is strongly linked to improved health. Summarily, these are known types of active transportation. Programs, like bicycle sharing programs, help to increase active transportation in many communities, and thereby improve public health across those communities. The health benefits of physical activity are well-established, including the prevention of weight gain and lowered risk of stroke and diabetes.

Public health advocates have embraced bicycle share programs as a way to increase active transportation. Users of these programs pay a fee to rent and check out bicycles from kiosks for short periods of time. Perhaps if there was a way to reduce or eliminate the fee paid, more users would be inclined, not only to make use of the program, but make use of it for extended periods of time, and thereby improve their overall physical health.

Some methods and systems in the prior art relate generally to bicycle or vehicle sharing programs. Other methods and systems relate to ways to update networks of individuals about another's biking progress.

Thus there is a need in the art for a method system that reduces or eliminates the costs associated with use of active transportation systems through a payment sharing plan, which thereby promotes public participation in active transportation and improves general public health.

SUMMARY OF THE INVENTION

Accordingly, one aspect of the present invention provides a vehicle sharing station having a holding structure configured for holding shared vehicles; and a kiosk associated with the holding structure. The kiosk has a screen and is configured to receive a prescribed travel distance and user selected destination and the screen displays at least one selectable travel plan satisfying the prescribed travel distance and the user selected destination.

Another aspect of the present invention provides a method of implementing a vehicle sharing reward program. The method includes the steps of: providing a prescribed travel distance to a user of a shared vehicle station; receiving at least one selected destination from the user; providing a selectable travel plan satisfying the prescribed travel distance and the at least one selected destination, where the selectable travel plan includes at least two kiosks that the user must check into and an associated travel distance; and upon user checking into the at least two kiosks, providing a credit to a rental cost, where the rental cost is composed of a first cost associated with the use of a shared vehicle based on the user satisfying the prescribed travel distance and a second cost associated with a duration of a stay at the at least one selected destination.

Another aspect of the present invention provides a method for distributing a kiosk, where the method includes the steps of: indicating the kiosk is up for bid via a computerized bidding system; collecting bids from at least one bidder, where each bid contains a price per kiosk requested and each price per kiosk requested is not lower than a minimum price per kiosk; calculating a bidding value for each bid based on an aggregated value and an aggregated size, the aggregated value including a cost-sharing price the bidder is willing to contribute to a rental cost associated with a duration of time a user of a vehicle sharing reward program stays at a location; selecting one or more winning bids based on optimization of geographical location, time coverage, financial return on each kiosk, and bidding value; and installing the kiosk at a location associated with the one or more winning bids.

BRIEF DESCRIPTION OF THE DRAWINGS

FIG. 4 shows a sampling of bids after the server receives bids and begins to generate an optimized kiosk location plan.

FIG. 6 shows an exemplary system output of a simulation that generates travel routes that satisfy a prescribed travel distance.

DETAILED DESCRIPTION OF PREFERRED EMBODIMENTS

Figure 1:
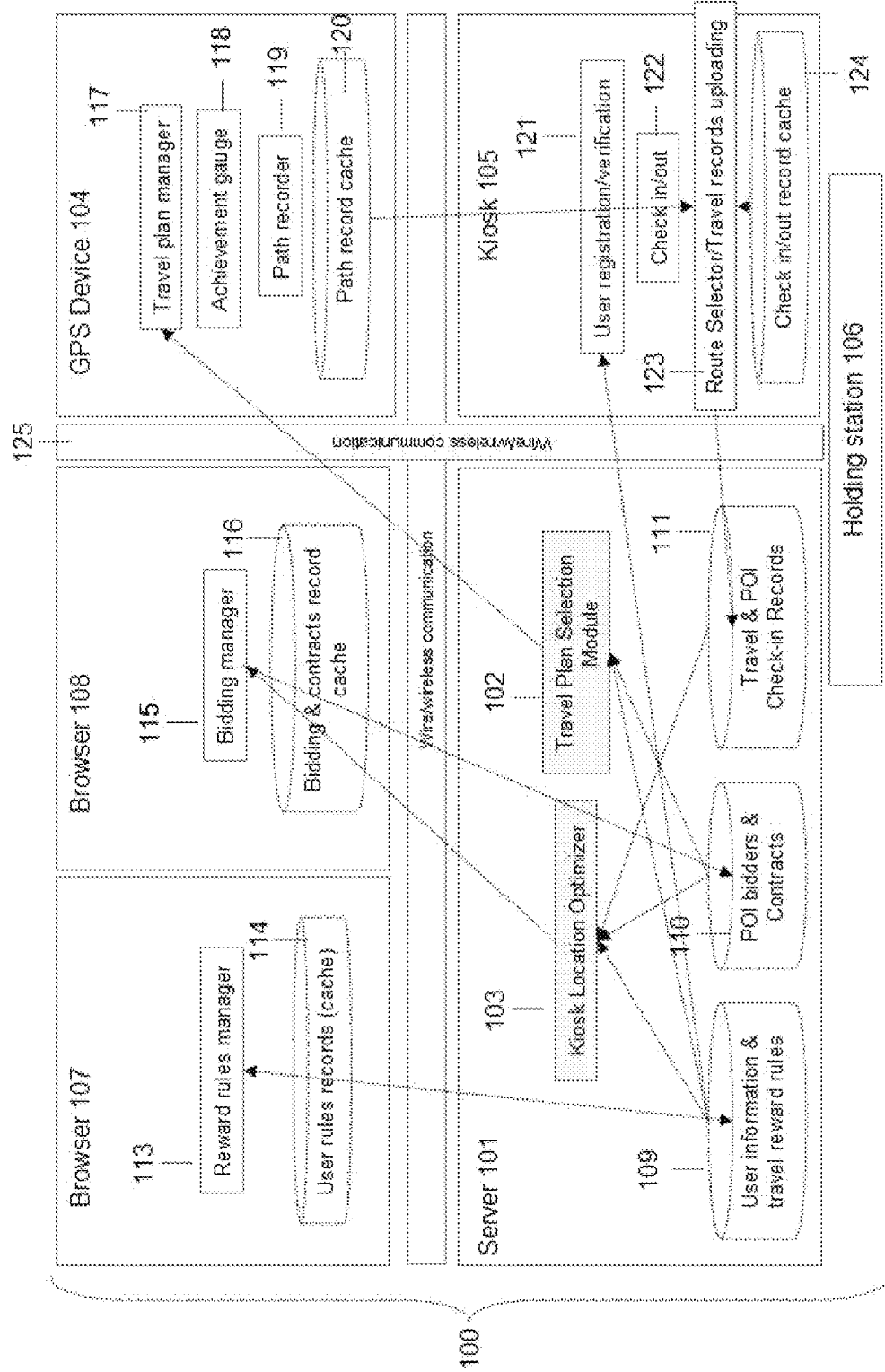
FIG. 1 shows a detailed view of the components of the cost-sharing system.

Embodiments of the present invention will now be described below with reference to the accompanying drawings. In the following description, elements that are identical are referenced by the same reference numbers in all the drawings unless noted otherwise. The configurations explained here are provided as preferred embodiments, and it should be understood that the technical scope of the present invention is not intended to be limited to these embodiments.

The present invention provides for a method of implementing a vehicle sharing reward program that encourages exercise and promotes good health habits. If a user chooses to participate in such a program, it would enroll in the program through a service provider. The service provider, in effect, is the manager of the sharing reward program and controls the flow of transportation, use of shared vehicles, and determines where kiosks, or check-in points, are located.

The service provider is mainly responsible for reimbursing a user of the program for the rental cost associated with the user satisfying one or more parameters associated with a trip. The parameters are provided by a physician based on a series on fitness tests that the user performs during the enrollment process. The fitness test can generate one or more parameters that the user will have to adhere to during use of the shared vehicle. The user is motivated to adhere by the prescription in order to qualify for its rental costs associated with its travel time paid for. These parameters include, but are not limited to, a prescribed travel distance, i.e., a user will have to travel some distance before it is eligible for the reward, a prescribed heart rate, a certain amount of calories burned, and other similar metrics.

Based on this concept, a service provider can be contemplated as some government constituency which is sponsoring health promotion programs, or similarly, a hospital or health clinic.

Once the user receives one or more prescribed parameters, it can be an active participant in the reward program. Once the user arrives at a vehicle sharing station, the user inputs information into the configured kiosk. This kiosk is used as a check-in station for each user enrolled in the vehicle sharing program. The information entered into the kiosk relates to the one or more destinations it would like to visit and the prescribed parameters for the trip. The destinations are selected from a list of participating locations which include, but are not limited to, restaurants, convenience stores, retail stores, locations for sight seeing, supermarkets, theatres, and gyms. These participating locations, or points of interest, have kiosks setup at their locations.

The one or more selected destinations are transmitted, by wireless or wireline communication, to a host server which processes the selections to generate a travel plan. The travel plan includes at least two of these configured kiosks that the user must check into. The process of checking-in at a kiosk informs the service provider that the user is abiding by the travel plan and the prescribed parameters of the trip.

In one embodiment, when the user checks-in at a kiosk, it uploads distance information recorded by and stored on a global positioning system (GPS) device issued by the service provider at enrollment. Therefore, if the user was given a prescribed travel distance to satisfy, the geographical coordinates uploaded at the kiosk from the GPS device tell the service provider and user whether the user is progressing along in its path in such a manner as to satisfy the prescribed distance. It is contemplated that the GPS device can give information of the distance already traveled and/or the distance needed to satisfy the prescribed distance.

In another embodiment, the user can have a smart device of its own, e.g., smartphone, that is configured with the applicable software to record geographical data and transmit the data to the host server. As mentioned above, it is contemplated that the user can have multiple parameters to satisfy. Any additional information associated with those parameters can be recorded and stored by the GPS device or configured smart device. The additional parameters can then be viewed by the user and uploaded to the kiosk. The information is then transmitted to the service provider, via the host server, to ensure that the user is on track to satisfy the one or more parameters.

Once the user has checked-in to the kiosks on his travel plan, the user is provided with a credit for its rental cost. As the present invention relates to a cost-sharing system, it is appropriate here to describe how the costs associated with the user renting a vehicle is shared, or distributed. As mentioned above, the service provider contributes to the cost associated with the duration of time the user is in motion. Another part of the trip is associated with the period of time the user is at rest, or in other words, staying a selected destination. The cost associated with the period of rest is covered by the owners of participating, destinations through a specific monetary contribution, as is explained in further detail below.

FIG. 1 shows one example of how a vehicle sharing station and a kiosk can be implemented in providing for a vehicle sharing reward program. Server 101 is communicatively coupled to kiosk 105 and a vehicle sharing station, or holding station 106. Through server 101, kiosk 105 permits a user of the reward program to input and access enrollment information such as the prescribed travel distance via user registration/verification 121 and select and update a preferred travel plan via and route selector/travel records uploading 123. GPS device 104 is configured with achievement gauge 118, which can be used to detect and track various metrics along with a distance traveled during a given trip.

The travel plan is composed of one or more destinations the user would like to visit on any particular trip. As will be explained in more detail below, once the destinations are selected, the server, through use of an algorithm, will provide the user with at least one travel plan that satisfies the prescribed travel distance.

In another embodiment, kiosk 105 can be configured to receive a prescribed travel speed. In this embodiment the user would not only have to complete the prescribed travel distance but do so in a timely fashion. Another embodiment also provides for kiosk 105 to receive other fitness goals that may accompany a user's health plan such as, but not limited to a prescribed heart rate and a prescribed amount of calories burned during a particular trip.

Holding station 106 stores shared vehicles. The types of vehicles usable in this type of program include, but are not limited to, bicycles, kayaks, canoes, and other types of human-powered vehicles. The types of vehicles used in such a program are those powered by human effort—this enables the user to gain health benefits by participating in the program.

Figure 2:
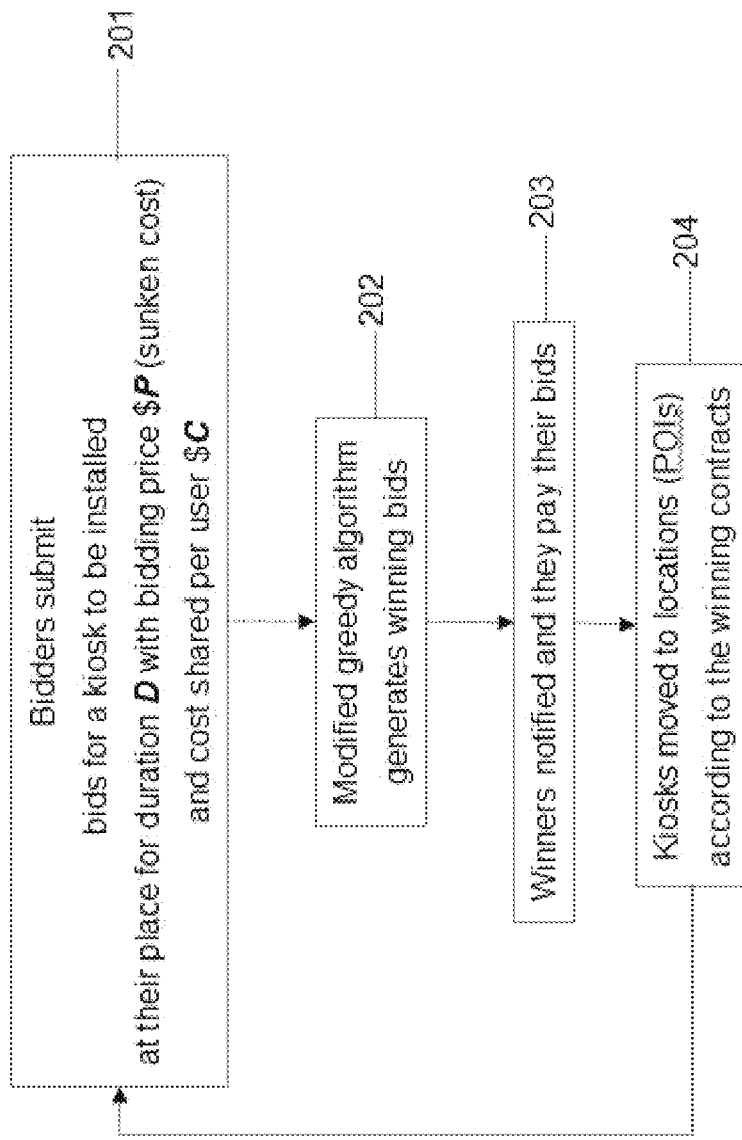
FIG. 2 shows a flowchart to illustrate the process of bidding for a configurable kiosk.

FIG. 2 shows a flowchart that represents the bidding process that business owners participate in to attempt to secure a kiosk for their location. Bids can be collected by the service provider during a particular timeframe which includes, but is not limited to a daily, weekly, or monthly basis.

At 201, the service provider informs business owners that a certain number of kiosks are available for distribution and business owners submit bids for a kiosk to be placed at their location. When the bidding period is open, depending on the numbers of kiosks available, the host server calculates a bottom price per kiosk, BPPK. The BPPK is generated from heuristic rules and government policies that may be in place where the program is implemented, with the goal to avoid bids of $0, or negative bids, from representing the winning bids.

When submitting a bid, a business owner considers a COS, or a cost of stay for a typical user of shared vehicle program, and MVS, or market value of a stay, an average customer profit per user visit, $P'. COS and MVS are each a function of the duration the typical user of shared vehicle program stays at the particular establishment. COS factors include some bidding price, $P, associated with that duration, which can be contemplated as a sunk cost in winning rights to the configurable kiosk.

A portion of any bid also contains a cost-sharing contribution, $C. This contribution represents the amount of money a bidder is willing to reimburse a user that stays at his location along a given travel plan. In one embodiment, the cost-sharing contribution can be based on a flat fee, or in alternatively, the contribution can be based on some dollar amount per user.

Because of these considerations, a bid will likely be less than or equivalent to the MVS, where the MVS is P' multiplied by an average number of customer visits, N, to that particular business location:

$$\text{MVS: } P'*N$$

$$\text{COS: } P+C*N$$

$$\text{MVS} \geq \text{COS} \tag{1}$$

If MVS>COS at a location, a business owner is incentivized to bid for a check-in kiosk. The present invention contemplates a scenario where a single POI contains multiple businesses, and therefore, that particular bid could be made by an alliance of businesses. In that scenario, the COS is shared amongst the different owners. The present invention also contemplates a scenario where a single POI contains a single business, e.g., a department store with a high customer profit per customer visit.

Referring back to FIG. 1, a conventional internet browser, in browser 108, can be used by bidders to place their bids.

Referring back to FIG. 2, at 202, the server, by way of a greedy algorithm, optimizes a kiosk location plan based on the total number of bids and generates winning bids. From a set of bids, the goal is to optimize a kiosk location plan based on geographical space, time coverage, financial return on each kiosk, and bidding value. With a bidding component in place, the cost-sharing program allows for short-term installation of a kiosk at some business location. The payments received from the winning bids pay for the rental cost associated with duration of time the user is in motion.

This step of optimization is related to the well-known knapsack problem within the field of approximation algorithms. Each bid has an aggregated value $v_i$, and $v_i$ is a function of P and C. Each bid also represents a potential node that the system would map to create a kiosk plan. This means that the service provider will provide an adequate number of destinations whenever possible (assuming enough bids are submitted) for the user to choose from while creating its travel plan, provide an adequate number of destinations in the specific time frames requested, and maximize revenues received from bidders to be able to cover its share of user rental costs.

First, maximize the following:

$$\sum_{i=1}^{n} v_i x_i \quad (2)$$

Each bid also has a size $s_i$, or as contemplated in the traditional knapsack problem, the capacity of the knapsack, and $s_i$ must be under some capacity value, B.

(2) is subject to:

$$\sum_{i=1}^{n} s_i x_i \leq B \quad (3)$$

B represents a certain number of kiosks the service provider can distribute during a given bidding period. B is equivalent to a total number of machines, m, also referred to herein as kiosk capacity. Also factored into B is a time constraint, or time capacity, is nm, where n is the timeframe requested in a bid for one or more kiosks. A geographical capacity, also factored into B, considers the areas covered by the service. It is assumed in the algorithm that each kiosk must be at least 1 km away from each other. If two bids are requesting "overlapping" nodes, meaning the distance between the requested nodes are less than 1 km, then the bid with the smaller value per size, VPS, will be rejected.

As an example of how these constraints work, if there are six bids made for a kiosk, Bid A, Bid B, Bid C, Bid D, Bid E, Bid F, the capacity restraints can work as follows: if $B_m$=10 and Bid A contains a request for 5 machines and Bid B contains a request for 7 machines, because the total number of machines requested, 12, is greater than $B_m$, the optimal kiosk location plan may not include a combination of the destinations represented by Bid A and Bid B.

With respect to time capacity, if Bid A entails a request for a noon-4 p.m. time slot and Bid C contains a request for a 1 p.m.-5 p.m. time slot, the optimal kiosk location plan may not include a combination of Bid A and Bid C, assuming the bidders of Bid A and Bid C are in competition with each other. With respect to geographical capacity, if Bid A and Bid D contain requests that overlap geographically, the conflict may bar the combination of Bid A and Bid D being included in an optimal kiosk location plan.

This greedy algorithm searches for some combination of bids, i.e., price/kiosk received, to accept and not accept to meet the capacity constraints but still maximize the price/kiosk received.

With typical greedy algorithms, optimization is performed in such a manner as to quickly converge into a solution. Generally, the algorithm chooses the "best" of the remaining bids that will "fit" in the knapsack, where "best" is defined by some metric(s), i.e., constraint. The present invention uses the metrics of time coverage and geographical coverage. With the use of greedy algorithms, the hope is that a local optimum will lead to the global optimum and the step of choosing remaining bids subject to some metric is repeated step until the knapsack is "full".

Ultimately, the greedy algorithm is a heuristic for the 0/1 knapsack problem-solutions chosen are not guaranteed to produce optimal result. Therefore, the present invention employs a polynomial time approximation scheme (PTAS) to form a modified greedy algorithm. It has been proven in PTAS that by first testing some number of combinations, h, it ensures that the sub-optimal outcome of a 1-ε approximation is found before the greedy algorithm outputs the same number of combinations that are based only on an immediate sorting of bids by the ratio of value to size. By immediately sorting VPS, the original greedy algorithm may not represent the global optimum. Calculating h forces the algorithm to find some number of the most profitable items, or combination of items, which provides for an optimized solution.

Here, because each solution found by the greedy algorithm is one that involves a local optimum of machine, temporal, and geographical capacity, the polynomial time approximation scheme-type algorithm is leveraged to avoid the greedy algorithm from falling into a local optimum too rapidly. Using PTAS forces the algorithm to test all possible combinations of bids out of the total bids before outputting solutions, and the process repeats according to value per size, or VPS, until the knapsack is full.

Therefore, using a polynomial time approximation scheme, all bids are sorted by the ratio of aggregated value to aggregated size.

$$\frac{v_1}{s_1} \geq \frac{v_2}{s_2} \geq \ldots \geq \frac{v_n}{s_n} \quad (4)$$

Next, assume optimal value=O and find an ε such that for all i, $v_i \leq \varepsilon O$.

Let $\quad (5)$ $$h = \left\lceil \frac{1}{\varepsilon} \right\rceil$$

-continued $$\text{for each} \quad S \subseteq N \quad (6)$$

$$\text{such that} \quad |S| \le h \quad (7)$$

Pack S in knapsack size, with a capacity B. Let i be the least profitable item in S, remove all bids such that $$j \subseteq N-S, v_j > v_i \quad (8)$$

Next, run the modified greedy algorithm on the remaining kiosk capacity based on sorting result according to $$B - \sum_{i \in S} s_i \quad (9)$$

After this, output the solutions that contain the winning bids. The solutions represent the optimized kiosk location plan.

At 203, the winning business owners complete contracts that state the terms and conditions related to the possession of one or more kiosks for some duration and pay their bids. At this point, those locations where kiosks are to be placed are deemed points of interest—the list of available destinations from which a user of the vehicle sharing reward program can choose from to create its travel plan.

At 204, the kiosks are moved to or configured at the POI according to the winning contracts. The present invention contemplates that the kiosks used in the program as standalone machines distributed by the service provider to the POI owners. The present invention also contemplates the fact that various businesses may already have existing kiosks or similar devices at their location but used for a different purpose. In that case, the existing kiosk can be configured through the downloading of the applicable software that permits it to communicate with the host server and record and store pertinent information associated with the check-in process and route upload functions.

The POIs are dynamic in the sense that when a new bidding period occurs, existing POIs and their locations may not be the same depending on if they participate in the new bidding period and/or the owner wins a contract.

Figure 3:
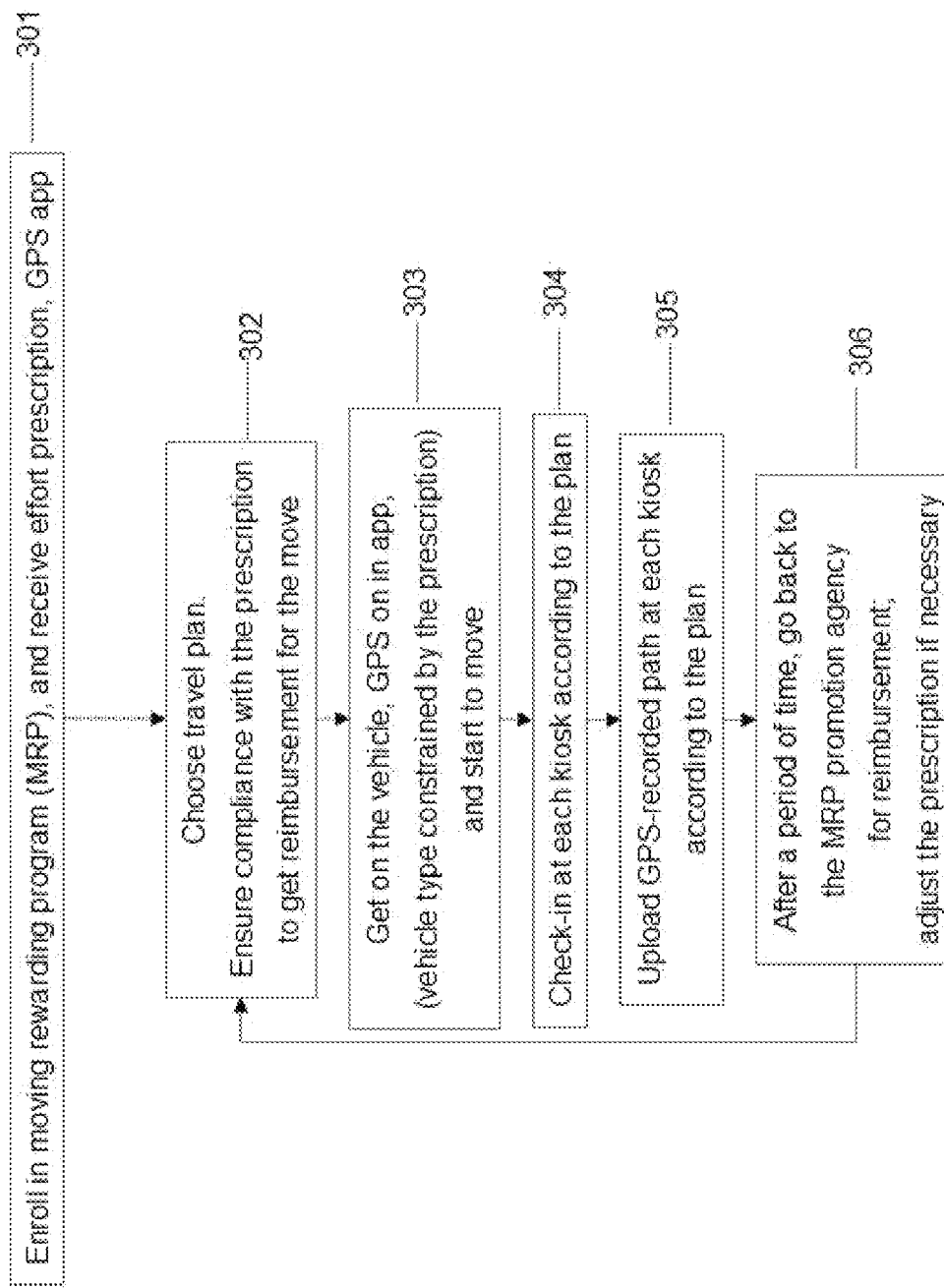
FIG. 3 shows a flowchart to illustrate how a user engages with the cost-sharing system.

Once the bidding is completed and the kiosks are in place at various POIs, a user can take full advantage of the reward program. As shown in FIG. 3, at 301, a user enrolls in a MRP, or moving reward program. It should be noted that while the description of FIG. 3 and the following embodiment refer to the user as a biker in a shared bicycle reward program, one skilled in the art can contemplate the present invention can be implemented with other vehicles and should not be interpreted as a limitation on the present invention.

In the MRP, the biker receives an effort prescription, or in other words, a daily, weekly, or monthly travel plan to adhere by while using the system. As alluded to above, the effort prescription represents some metric the biker must maintain in order to obtain reimbursement of its rental fees. Achievement gauge 118 and path recorder 119 of GPS device 104 can be used to detect and track levels of effort expended during a given trip.

In one embodiment, when the biker enrolls in the MRP, the biker receives GPS device 104 with the appropriate system software thereon. The GPS device tracks and records the commuter's movements, distances traveled, and efforts expended. Alternatively, in another embodiment, the appropriate system software can also be in the form of an uploadable file. Therefore, if the biker has a smart device, such as a smartphone, it can download the GPS software application to configure the smart device.

At 302, the biker visits a vehicle sharing station and kiosk to create his travel plan. The biker can input a start and end location and a maximum distance it would like to travel before each break. A break constitutes a stop, visit, and stay at POI. The biker can choose from a list of available POIs. The biker can also customize its travel plan by selecting from a list of criteria that includes whether the travel plan should be altered based on: its daily/weekly/monthly prescription or health adherence; the system not duplicating POIs; and a path that generates a fully reimbursable route.

Through use of the present system, a biker seeks to have the time period associated with its physical movement paid for by the health promotion program and each time period associated with a stay at a POI paid for by the POI owner. In effect, this process results in the bicycle rental cost being shared and results in a full reimbursement to the biker for its payment for the rental period.

Ultimately, the goal of the present system is to encourage the biker's compliance with the health prescription, or a daily health adherence, by offering the biker the potential for free use of the bicycle.

Once the criteria and POIs are selected, server 100 processes the selections and creates an acceptable travel plan, which represents one or more routes that allow the user to satisfy a given prescription. The acceptable travel plan satisfies the following condition:

$$\text{EAE(Exercice Adherence Effort)} \ge \text{Effort Prescription} \quad (10)$$

where EAE represents the actual effort the user would expend within a given travel plan.

To obtain this condition, an algorithm considers that given a set of k efforts $(e_1, e_2, \ldots, e_k)$ for biking between each pair of COS-reimbursable POIs, with $e_1 < e_2 < \ldots < e_k$, a vector of coefficients $(c_1, c_2, \ldots, c_k)$ are needed such that $$\sum_{i=1}^{k} c_i e_i \ge p \quad (11)$$

where c is a positive integer starting from zero and p=minimum value of a parameter(s) described in health prescription. As an example where the health prescription is a prescribed travel distance, in the proposed function, if $c_i=1$ for $e_i$, a link is the distance related to direct path between two nodes. A link is represented by $e_i$ is traveled once. If $c_i=2$, the link is some distance traveled twice, with multiple iterations following thereafter.

Each POI represents a node mapped by the algorithm. The algorithm traces back from a first destination D to find a largest travel effort $e_x$ among minimum $c_x$ between D & and a second destination D', let $c_x$++ and set new destination as D', and check if $\Delta \le x$ 0, where $$\Delta = p - c \cdot e \quad (12)$$

The previous step is repeated until either D'=S (source) or $\Delta \le 0$. S represents a third destination. In this embodiment, the running of the algorithm treats S as the final destination, or in other words, the location from which the user began its journey. In another embodiment, the running of the algorithm does not have to include the condition of $\Delta \le 0$.

If $D'<S$ or $D'>S$ and $\Delta \le 0$, then roll back a node and select second largest $e_y$ among minimum $c_y$, and continue the search for the path that achieves the above condition.

If $D'=S$ and $\Delta>0$, then roll back a node and select second largest $e_y$ among minimum $c_y$, and continue the search.

If $D'=S$ and $\Delta \le 0$, then present this path to the biker, and continue the search for more paths that satisfy the particular criteria. This condition represents the satisfaction of a valid distance goal, as each path presented to the user in this embodiment is one that is greater than or equivalent to the prescribed distance.

As an example, suppose A, B, and C are POIs—link 1 is A to B, link 2 is B to C, link 3 is C to A and $e_1$, $e_2$, $e_3$ are 3, km, 4 km, and 5 km respectively. As mentioned above, $c_1=1$ means the user either travel from A to B, or from B to A, and 3 km accumulated 3 km towards his prescribed distance. If $c_1=2$, while $c_2=0$ & $c_3=0$ means used either traveled from A to B and back to A, or B to A and back to B. If $c_1=2$, while $c_2=1$ & $c_3=0$, this means the user either traveled from C to B to A to B, or C to A to B to A. However, no matter what path is chosen by the user, the aggregate distance equals or 3 km*2+4 km, or 10 km.

$c_i$ coefficients are important and are stored by the server, because the algorithm keeps track of links traversed as to avoid creating travel plans that overuse one or more of the same links. By examining $c_i$ vector, the algorithm knows which link to go to next by choosing minimum $c_i$, i.e., zero best, if not, the choose the link with minimum coefficient.

In an alternative embodiment, $e_i$ represents a distance and speed goal. In the embodiment, the travel plans displayed to the user are those that satisfy the speed requirement. Upon reaching a first kiosk, if the user realizes it failed to meet the speed goal after uploading information to the kiosk, the kiosk can re-configure the travel plan to ensure that the next leg of the trip can satisfy the speed and distance goal.

At 303, once at least one optimized travel plan is generated, the biker selects a optimized path and travels thereon with the GPS device or software application in the enabled position. At 304, the commuter checks-in at a POI by inputting its information into the kiosk located there. At 305, the user uploads its GPS-recorded path and does so at each POI it visits. At 306, the biker, after some period of time and distance traveled, return to the MRP agency to collect his reimbursement. At this point, the commuter can adjust the health prescription to further tailor the prescription to updated health goals or can modify the travel plan by changing previously selected POIs.

Consider the foregoing methods and equations as applied to an exemplary installation in which the reward program is implemented in a bike share system. The following embodiment refers, in part, to FIG. 1 and refers to a cost-sharing service provider (SP).

On a Sunday, the SP prepares 15 kiosks for bidding. The SP configures server 100 for bidding with kiosk location optimizer 103, bidding manager 115 and bidding and contracts record cache 116 and to receive bids via the internet, such as browser 108. The SP receives 40 bids for a total of 79 kiosks, where many of the bids include requests for at least two kiosks for the next four weeks, Week 1, Week 2, Week 3, Week 4. With 79 requested kiosks for 15 configured kiosks, it is not likely that the system will accept all of the bids, and therefore, a process of optimization must occur.

One such bid is from a department store (DS). The DS owner places a bid via browser 108: three kiosks to be placed in the lobby of location A, for one week (7 days) in Week 3, at a bidding price of $1006, where the cost-sharing limit is $11 per biker per day. On Sunday night, the SP runs kiosk location optimizer 103 to create an optimized kiosk location plan and generate winning bids considering the DS owner's bid and all other bids received. Assuming all bids are mutually exclusive, i.e., no time or geographical conflicts, then the optimal value is the summation of values of the first X elements in the bidding list sorted by $v_i/s_i$ that covers 28 (days)*15 (machines), i.e., time capacity nm, or 420.

Using the DS bid as an example, $$v_i/s_i=(1006+w*11)/(7*3)=48.43$$

where w is weight, an optional value in the calculation.

By Monday morning, the winners, or respective POI owners, are notified via the internet and browser 200. The DS owner is chosen as a winner, and it pays its bidding amount. After payment is completed, the SP delivers the three kiosks to the lobby of location B, or the DS owner's requested location.

Figure 4:
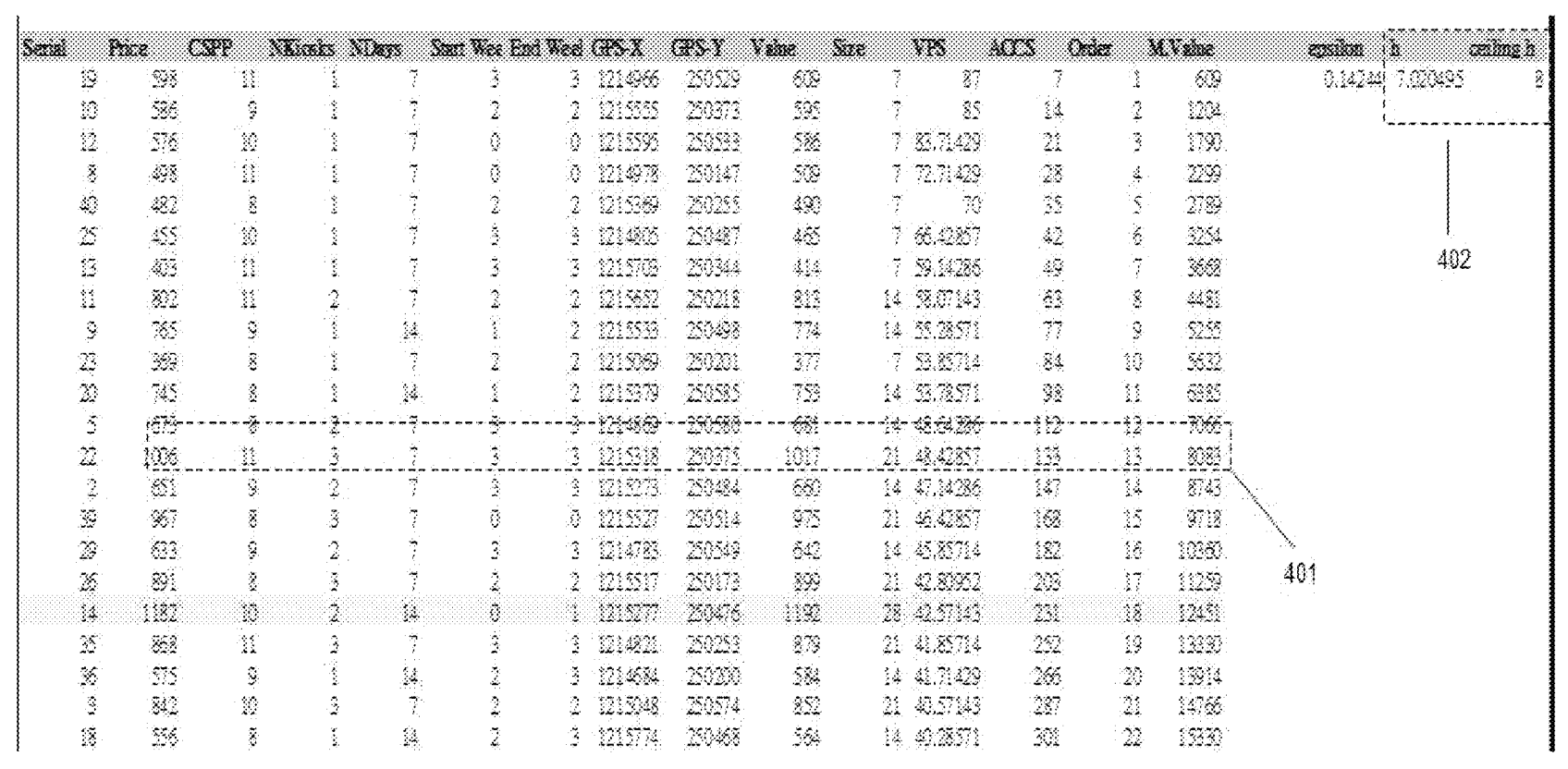

FIG. 4 shows an example of an internal output of the host sever after the running of a simulation of the bidding process with 40 bids. The dashed box at 401 highlights the DS bid.

The headings in the table are as follows:
Serial: submission order
Price: bidding price to "rent" the mobile kiosks
CSPP: cost sharing per person (per day)
Nkiosks: number of kiosks (you want more if you expect many people checking in at the same time)
Ndays: number of days
Start week: 0-3, 0 means immediately next week
End week: 0-3, duration=(end_week−start_week)*7 days
Gpsx: longitude*10000
Gpsy: latitude*10000
Value: =(Price+w*CSPP)
Size: =(nkiosks*ndays)
VPS: value/size
ACCS: accumulated size from top down in the ordered list
M. value: maximum value collected at some point in the simulation from top down in the ordered list The location plan is generated is using the modified greedy algorithm, as mentioned above, based on a 1-ε approximation and h=8, shown at 402. h is calculated by dividing the highest M. value, 19868, (not shown) by the highest value 2830 (not shown). Therefore, using h, and testing all eight possible combinations of a possible 40 bids, the sorted bids are searched to ensure the 1-ε approximation and the optimum VPS. The remaining bids are quickly added to each 8-combination using a greedy algorithm. The remaining bids are added according to the VPS and are added until the point where no additional bids can be fit in during Weeks 1-4.

Figure 5:
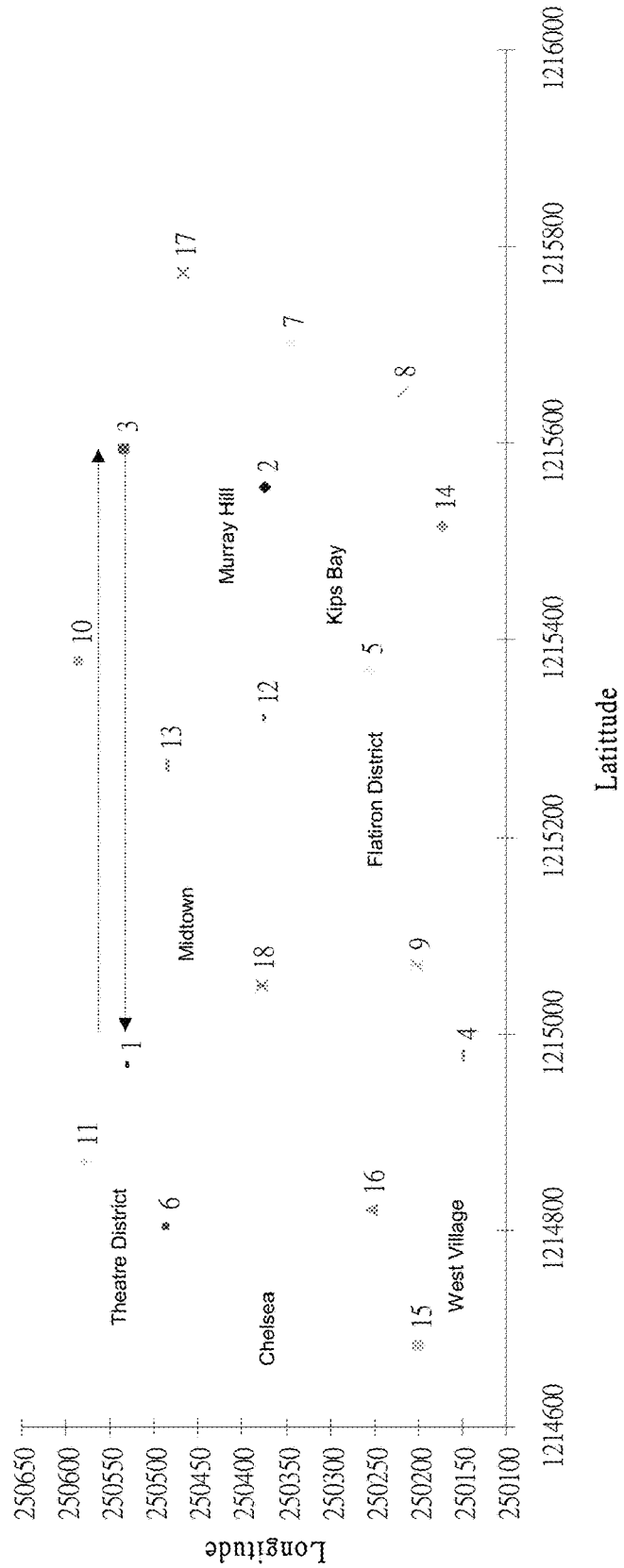
FIG. 5 shows an exemplary system output of a geographical arrangement of kiosks once a location plan is optimized and travel plan.

FIG. 5 shows an example of an optimized kiosk location plan once the running of the algorithm is complete. Each numbered node represents a winning bid. Additionally, FIG. 5 illustrates the selection of a particular set of POIs by a biker, as the biker now has the ability to select from available POIs.

A travel plan can be generated once the kiosks are in place at the various POIs, i.e., post-bidding and kiosk distribution. In FIG. 5, the directional arrows symbolize an exemplary display of a travel plan between the user-selected points of interest located at node 1 and node 3.

FIG. 6 shows an example of an internal output of the travel plan selection module 102. As an example, if a user has an effort prescription in the form of a prescribed travel distance of 10 km, the server generates one or more travel plans using equations (10), (11), and (12) that allow the user to travel a distance of at least 10 km. Thereafter, the user has the choice of the combinations presented on a screen of the kiosk (not shown). Note that each plan generated satisfies the prescribed travel distance of 10 km.

Various modifications and changes may be made to the foregoing embodiments as would be obvious to a person skilled in the art having the benefit of this disclosure. It is intended that the invention embrace all such modifications and changes and, accordingly the above description is to be regarded in an illustrative rather than a restrictive sense.

What is claimed is:

1. A computer-implemented method, comprising:
providing, by a server operably coupled to a processor and communicatively coupled to a kiosk and a vehicle sharing station that stores shared vehicles, a prescribed travel distance for a user of the vehicle sharing station, wherein the providing is to the kiosk;
receiving, by the server, from the kiosk, at least one selected destination from the user;
providing, by the server, to the kiosk, a selectable travel plan satisfying the prescribed travel distance and the at least one selected destination for travel by the user on a shared vehicle of the shared vehicles, wherein the selectable travel plan comprises at least two kiosks that the user must check into and an associated travel distance;
and evaluating, by the server, from at least one of the at least two kiosks, information uploaded by the user via a global positioning device communicatively coupled to the at least one kiosk and that recorded a path traveled by the user on the shared vehicle;
upon the server receiving notification, from the at least two kiosks, that the user has checked into the at least two kiosks, providing, by the server, a credit to a rental cost, wherein the credit is based on cost-sharing between two parties other than the user, wherein the credit to the rental cost is comprised of:
a first credit based on first payment from a first party of the two parties towards a first cost, wherein the first cost is accumulated based on a first duration of time that the shared vehicle obtained at the vehicle sharing station is in motion by the user and based on the user satisfying the prescribed travel distance and;
a second credit based on second payment from a second party of the two parties towards a second cost, wherein the second cost is accumulated based on a second duration of time that the shared vehicle is at rest at the at least one selected destination, wherein the first party comprises a service provider and the second party comprises an owner of the at least one selected destination, and wherein the server processes geographical coordinates indicative of a location of the shared vehicle and generated by the GPS device to determine whether the user satisfied the prescribed travel distance, wherein the server, the kiosk, the at least two kiosks, vehicle sharing station work together to provide a program that allows users to exercise and travel from place to place while having reduced or no cost to use the shared vehicle.

2. The computer-implemented method of claim 1, wherein the credit to the rental cost is transferred to a prepaid debit card.

3. The computer-implemented method of claim 1, further comprising:
providing, by the server, a prescribed travel speed to the user of the vehicle sharing station.

4. The computer-implemented method of claim 3, wherein the providing the credit to the rental cost is also based on the user satisfying the prescribed travel speed.

5. The computer-implemented method of claim 1, wherein the owner of the at least one selected destination is associated with a bidding alliance.

6. The computer-implemented method of claim 1, wherein the prescribed travel distance is issued within a general health plan, and wherein the general health plan is updateable.

7. The computer-implemented method of claim 6, wherein the general health plan includes a prescribed fitness goal the user has to satisfy to receive the first credit of the first cost associated with the rental cost, and wherein the prescribed fitness goal comprises a prescribed heart rate or a prescribed amount of calories burned.

8. The computer-implemented method of claim 1, wherein the at least one selected destination is selected from the group consisting of a restaurant, a convenience store, a retail store, a location for sight seeing, a supermarket, a theatre and a gym.

9. The computer-implemented method of claim 1, wherein the shared vehicle is a bicycle.

10. The computer-implemented method of claim 1, wherein the shared vehicle is a canoe.

11. The computer-implemented method of claim 1, wherein the shared vehicle is a kayak.

* * * * *